US008688525B2

(12) United States Patent　　　(10) Patent No.: US 8,688,525 B2
Minde　　　(45) Date of Patent: Apr. 1, 2014

(54) SYSTEM AND METHOD FOR IMPLEMENTING A CONTEXT BASED PAYMENT SYSTEM

(75) Inventor: Tor Björn Minde, Gammelstad (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 0 days.

(21) Appl. No.: 13/334,503

(22) Filed: Dec. 22, 2011

(65) Prior Publication Data

US 2013/0166398 A1　Jun. 27, 2013

(51) Int. Cl.
*G06Q 30/06*　　(2012.01)

(52) U.S. Cl.
USPC ............. 705/16; 705/17; 705/26.41; 705/41; 705/14.54; 235/380; 235/375; 235/379; 709/204

(58) Field of Classification Search
USPC ................. 705/16, 26.41, 41, 39, 43
See application file for complete search history.

(56) References Cited

U.S. PATENT DOCUMENTS

| | | | |
|---|---|---|---|
| 6,957,393 B2 | 10/2005 | Fano et al. | |
| 7,509,679 B2 * | 3/2009 | Alagna et al. | 726/24 |
| 7,949,582 B2 * | 5/2011 | Mennie et al. | 705/35 |
| 8,191,776 B2 * | 6/2012 | Ben-Zvi et al. | 235/380 |
| 2004/0199470 A1 * | 10/2004 | Ferry et al. | 705/44 |
| 2005/0125295 A1 * | 6/2005 | Tidwell et al. | 705/16 |
| 2005/0144111 A1 | 6/2005 | Manstein et al. | |
| 2007/0016535 A1 * | 1/2007 | Tedesco et al. | 705/67 |
| 2009/0106115 A1 * | 4/2009 | James et al. | 705/14 |
| 2009/0210274 A1 | 8/2009 | McMahon et al. | |
| 2010/0094771 A1 * | 4/2010 | VanderPal | 705/36 R |
| 2010/0217680 A1 * | 8/2010 | Fusz et al. | 705/26 |
| 2011/0099105 A1 * | 4/2011 | Mennie et al. | 705/41 |
| 2011/0238510 A1 * | 9/2011 | Rowen et al. | 705/16 |
| 2012/0072353 A1 * | 3/2012 | Boone et al. | 705/64 |
| 2012/0173402 A1 * | 7/2012 | Nicolaidis et al. | 705/37 |

* cited by examiner

*Primary Examiner* — Vanel Frenel
(74) *Attorney, Agent, or Firm* — Potomac Patent Group PLLC

(57) ABSTRACT

Disclosed herein is a context based payment system. Electronic currency or coupons can be made dependent on context, and the context can be one of location or geography, time, date, distance, sound, or other devices. The value of the currency exists only if a pre-condition is fulfilled. For example, if the currency is location dependent, the value only exists in a defined area (currency value area). The goods or the service in the value-system are also context dependent, that is, they can only be sold or offered in a defined area (product value area). Accordingly, if the product value area and the currency value area overlap, a purchase and payment can be made.

32 Claims, 8 Drawing Sheets

SYSTEM AND METHOD FOR IMPLEMENTING A CONTEXT BASED PAYMENT SYSTEM

TECHNICAL FIELD

The present invention relates generally to currency systems, and more specifically to systems and methods for implementing a context based payment system.

BACKGROUND

Local producers are sometimes forced to price goods relative to distant competition, and, because of lower production and wage costs in different parts of the world (or even country), substantially lower profit margins can be the result. There are times, however, when consumers might be willing to buy locally produced goods for the good of the society, and that attitude is more prevalent today than in the past. But what a consumer says they will do, and what actually occurs in practical, real shopping situations can be significantly different. Faced with competitive quality products, but disparate prices, the consumer often feels that he or she has no real choice, especially if budgets are more constrained because of uncertain economic conditions, and therefore are not what they used to be. Thus, personal economic pressures can hinder "good" buying decisions. Retailers too are cognizant of an increased awareness for the value of locally produced products. They market local producers and even arrange special sections with "good" products, i.e., those that minimally impact the environment both in terms of environmental friendly manufacturing methods, but also those articles that have been produced locally.

Thus, current economic conditions, and prevailing economic theories make it difficult, if not impossible, for an average consumer to make an impact on their local economy and their local environment, regardless of their attitudes. Accordingly, it would be desirable to provide methods, and systems for creating a context based payment system.

SUMMARY

It is therefore a general aspect to provide a system and method for exchanging currency and products that will obviate or minimize problems of the type previously described.

According to a first aspect, a method for enabling location dependent exchanges of goods and services using a location dependent currency is provided, comprising verifying, at a currency server, that a product being offered for sale is within a predetermined product value area associated with the product, receiving, at the currency server, an offer of location dependent currency in exchange for the product, wherein the location dependent currency is only valid within a predetermined currency value area, and completing, at the currency server, the sale of the product in the predetermined product value area by exchanging location dependent currency for the product when the location of the product being offered for sale is within both the predetermined product area and the predetermined currency value area.

According to the first aspect, the step of verifying that a product being offered for sale is within a predetermined product value area comprises determining a location of a product offered for sale by use of a location determination system application in a mobile communications device, determining a product identification number of the product being offered for sale, communicating the location of the product and the product identification number to a product issuer server, wherein the product issuer server includes a database that contains a list of products and valid product value areas searchable by product identification numbers, and determining that the product is being offered for sale in a valid predetermined product value area.

Still further according to the first aspect, the location determination system is one of global positioning systems, Wi-Fi ID, cell-ID look-up, location information on a product tag, and network based positioning. The method according to the first aspect further comprises determining by the currency server that the product is being purchased within a valid currency value area.

According to the first aspect, the step of completing the sale of the product comprises notifying a payment system server that a valid sale of the product can occur; and receiving, at the currency server, an authorization transmitted by the payment system server that a predetermined amount of location dependent currency can be transferred from a first location dependent account of a purchaser held at the currency server to a second location dependent currency account of the retailer held at the currency server.

According to the first aspect, the method further comprises exchanging location dependent currency held in the location dependent currency account of the retailer for regular currency, and wherein the step of exchanging location dependent currency for regular currency comprises forwarding a request from either a producer or retailer for the exchange of location dependent currency to a bank, wherein an appropriate amount of regular currency is transferred to an account of the producer or retailer.

According to a second aspect, a method for enabling purchases within a location based payment system is provided, comprising receiving, at a point of sale terminal disposed at a geographical location, information from a tag associated with a product for sale, the information including a product value area associated with the product, verifying, by the point of sale terminal, that the product is being sold within the product value area by comparing the geographical location of the point of sale terminal with the product value area, receiving, by the point of sale terminal, location dependent currency in proposed exchange for the product, wherein the location dependent currency has value only within a currency value area, verifying, by the point of sale terminal, that the geographical location of the point of sale terminal is within the currency value area; and completing a transaction of the product in exchange for the location dependent currency based upon results of the verifying steps.

Still further according to the second aspect, the method further comprises determining, by the point of sale terminal, a product value area cost associated with the product based, at least in part, on the geographical location, and wherein the step of verifying that the geographical location of the point of sale terminal is within the currency value area comprises transmitting a request for a currency value area of the point of sale terminal to a currency server, and receiving the currency value area from the currency server, and comparing it to the geographical location of the point of sale terminal.

According to the second aspect, the determination of the geographical location of the point of sale terminal comprises using a location determination system application in the point of sale terminal to obtain the geographical information. Still further according to the second aspect, the location determination system is one of global positioning systems, Wi-Fi ID, cell-ID look-up, location information on a product tag, and network based positioning.

According to the second aspect, the step of completing the transaction of the product comprises notifying a payment system server that a valid sale of the product can occur, and receiving, at a currency server, an authorization transmitted by the payment system server that a predetermined amount of location dependent currency can be transferred from a first location dependent account of a purchaser held at the currency server to a second location dependent currency account of the retailer held at the currency server.

According to the second aspect, the method further comprises exchanging location dependent currency held in the location dependent currency account of the retailer for regular currency, and wherein the step of exchanging location dependent currency for regular currency comprises forwarding a request from either a producer or retailer for the exchange of location dependent currency to a bank, wherein an appropriate amount of regular currency is transferred to an account of the producer or retailer.

According to a third aspect, a method for enabling purchasing of location dependent products using location dependent currency is provided, comprising verifying, by an electronic wallet, that a product is within a valid product value area, verifying, by the electronic wallet, that both sufficient location dependent currency is available for purchase of the product and that the electronic wallet is within a valid currency value area, and initiating purchase of the product.

According to the third aspect, the step of verifying that a product is within a valid product value area comprises determining a geographical location of a product offered for sale by use of a location determination system application in the electronic wallet, determining a product identification number of the product being offered for sale, communicating the location of the product and the product identification number to a product issuer server, wherein the product issuer server includes a database that contains a list of products and valid product value areas searchable by product identification numbers, identifying the valid product value area of the product in the database, and comparing the geographical location of the product to the product value area, and determining that the product is being offered for sale in a valid predetermined product value area.

According to the third aspect, the location determination system is one of global positioning systems, Wi-Fi ID, cell-ID look-up, location information on a product tag, and network based positioning, and the step of verifying that the electronic wallet is in a valid currency area comprises transmitting request to a currency server to provide the valid currency area for the electronic wallet and comparing the geographical position of the electronic wallet to the valid currency area, and determining by the currency server that the product being purchased is within the valid currency value area.

According to the third aspect, the method further comprises notifying a payment system server that a valid sale of the product can occur, and receiving, at the electronic wallet, an authorization transmitted by the payment system server that a predetermined amount of location dependent currency can be transferred from a first location dependent account of an owner of the electronic wallet held at the currency server to a second location dependent currency account of the retailer held at the currency server.

According to the third aspect, the method further comprises displaying, in the form of a first graphical user interface on the electronic wallet, information pertaining to the transfer of location dependent currency from the location dependent currency account of the owner of the electronic wallet.

Still further according to the third aspect the step of verifying by the electronic wallet that sufficient location dependent currency is available for purchase of the product comprises storing a first amount of location dependent currency that is held in a location dependent currency account of an owner of the electronic wallet, and verifying by at least one of inspecting and electronically determining that the amount of the purchase of the product is no more or equal to the stored first amount of location dependent currency in the electronic wallet.

According to the third aspect, the method further comprises exchanging location dependent currency held in the location dependent currency account of the retailer for regular currency, and wherein the step of exchanging location dependent currency for regular currency comprises forwarding a request from either a producer or retailer for the exchange of location dependent currency to a bank, wherein an appropriate amount of regular currency is transferred to an account of the producer or retailer.

Still further according to the third aspect, the step of verifying that the electronic wallet is within a valid currency value area comprises displaying, in the form of a second graphical user interface on the electronic wallet, information indicating that the electronic wallet is within a valid currency value area.

According to a fourth aspect, a system for enabling location dependent exchanges of goods and services using a location dependent currency is provided, comprising a currency server configured to verify that a product being offered for sale is within a predetermined product value area associated with the product, and wherein the currency server is further configured to receive an offer of location dependent currency in exchange for the product, wherein the location dependent currency is only valid within a predetermined currency value area, and further wherein the currency server is still further configured to complete the sale of the product in the predetermined product value area by exchanging location dependent currency for the product when the location of the product being offered for sale is within both the predetermined product area and the predetermined currency value area.

According to the fourth aspect, the system further comprises a product issuer server, and a mobile communications device configured to determine a location of a product offered for sale by use of a location determination system application in the mobile communications device, determine a product identification number of the product being offered for sale, and communicate the location of the product and the product identification number to the product issuer server, wherein the product issuer server is configured to include a database that contains a list of products and valid product value areas searchable by product identification numbers.

According to the fourth aspect, the location determination system is one of global positioning systems, Wi-Fi ID, cell-ID look-up, location information on a product tag, and network based positioning, and wherein the currency server is further configured to determine that the product is being purchased within a valid product value area and a valid currency value area according to information received from the product issue server contained in the database in regard to the product and product value area.

According to the fourth aspect, the system further comprises a payment system server configured to receive notification from the currency server that a valid sale of the product can occur, and wherein the currency server is configured to receive a purchase authorization transmitted by the payment system server such that a predetermined amount of location dependent currency can be transferred from a first location dependent account of a purchaser held at the currency server to a second location dependent currency account of the retailer held at the currency server.

According to the fourth aspect, the system further comprises a producer and/or retailer; and a bank, wherein a regular currency account is maintained at the bank for the producer and/or retailer, and wherein the bank is configured to receive a request from the producer and/or retailer to exchange the location dependent currency for regular currency, and to deposit the regular currency in the regular currency account.

BRIEF DESCRIPTION OF THE DRAWINGS

The above and other objects and features of the present general inventive concept will become apparent and more readily appreciated from the following description of the embodiments with reference to the following figures, wherein like reference numerals refer to like parts throughout the various figures unless otherwise specified, and wherein.

DETAILED DESCRIPTION

Figure 1:
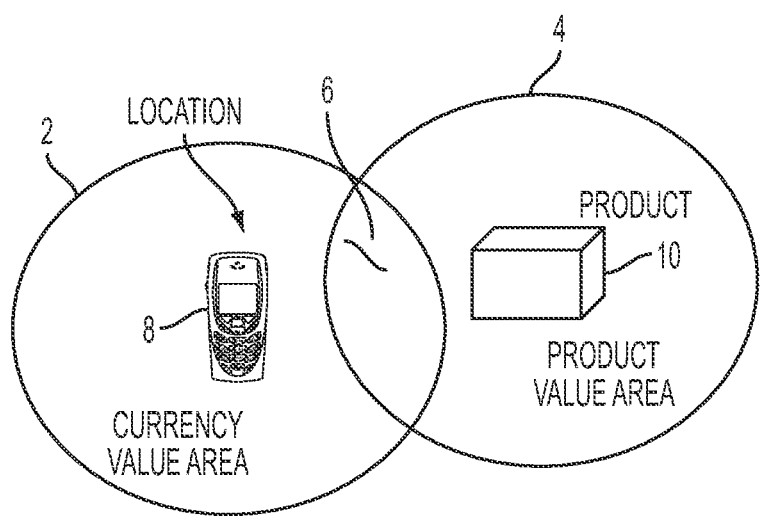
FIG. 1 illustrates an interaction between a context dependent currency and context dependent goods/services provider.

The inventive concept is described more fully hereinafter with reference to the accompanying drawings, in which embodiments of the inventive concept are shown. In the drawings, the size and relative sizes of layers and regions may be exaggerated for clarity. Like numbers refer to like elements throughout. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the invention is therefore defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Used throughout the specification are several acronyms, the meaning of which are provided as follows: near-field communication (NFC) device; global positioning system (GPS); radio frequency identification (RFID); quick-response codes (QR-codes); and graphical user interface (GUI).

As discussed above, consumers that sincerely desire to make a difference in the types of products purchased, the origin of the products, and the manufacturing methods, probably, in reality, find it extremely difficult to affect that choice when economic realities are un-glaringly exposed. According to exemplary embodiments, an alternative market is needed to facilitate the transfer of wealth from consumers to producers in a manner that satisfies the desire of the consumer to purchase only locally grown farm products, or those manufactured products that are locally manufactured and/or meet certain environmental manufacturing guidelines. However, an alternative market needs an alternative currency or carrier of value, which can be, for example, money or coupons. There is no currency system available today, nor coupon system, which can discriminate between currency value and other values such as environmental or local production.

Current technical implementations of electronic payment systems are based on the current currency system, regardless of the location it is being used. The coins and notes have an equivalent digital representation in a digital payment system. The credit cards or phones with secure elements implement the value of current currencies. It is equivalent to use a near-field communication (NFC) based credit card and to pay using physical coins.

Some currencies only exist in electronic form, such as "bitcoin." Bitcoin is a peer-2-peer electronic payment system, but is only equivalent to regular currency. Alternative markets are being discussed, but even in such markets the same rules as in the regular market would apply. Demand and supply would guide the pricing and settle at levels sufficient for these markets as well. In such a market, locally produced food (or any other goods) could be valued at the "good" level (probably at a higher level than normal) making it profitable and possible to run a business not only for the "good" of the society but for the possible monetary value taking the "good" value into account.

The value carrier in society today (i.e., the currency) can only carry the monetizing value. Without digressing too deeply into economic theory, which would be far beyond the scope necessary to understand the invention, monetization is the process of creating currency in a particular location, most often a nation or country. For example, the United States used to rely on gold as a source of value for its coins and currency. That inherently limited the creation of wealth, and consequently the prosperity of the nation. In the late 1900's the U.S. went off the gold standard, and instead it, like many other countries, relies only on its own good faith to provide the value for its currency. That is to say, the U.S. "backs" the currency by in essence promising that it will not just disappear, and that it supports its currency.

Accordingly, because currency works the way it does, it is not possible at this time to represent other values, such as low $CO_2$ emissions, ecological production, local production, or other factors, as values in the currency. According to an exemplary embodiments, a problem solved by the context based payment system is how to represent other values in a new type of currency, and thereby enable creation of alternative markets. According to further exemplary embodiments, the main value addressed is local production, or geography, although the invention is not limited thereto.

According to exemplary embodiments, electronic currency or coupons is made dependent on one or more alternative contexts. The value of the currency exists only if a pre-condition is fulfilled. By way of a non-limiting example only, if the currency is location dependent, the value only exists in a first limited area. According to further exemplary embodiment, the goods or services in the value-system is also context dependent. Again by way of a non-limiting example, goods or services can only be sold or offered as locally produced products in a second limited area. According to an exemplary embodiment, therefore, a sale can be made only if the first limited area, in which the context dependent currency has value, overlaps the second limited area, in which the context dependent good/services (herein after "product(s)") can be sold. An illustration of an interaction between context dependent currency and context dependent products is shown in FIG. 1.

In FIG. 1, currency value area 2 exists, and intersects with product value area 4. the intersection between currency value area 2, and product value area 4, is known as context area 6. Product 10 has value only in product area 4, and context dependent currency (herein after, according to an exemplary embodiment, referred to as "location dependent currency" (LDC)) 8, only has value within currency value area 2. Mobile device 8 can be used to facilitate exchange of LDC 8 for location dependent products (LDP) 10.

According to various exemplary embodiments, the systems and methods for providing a context based payment system described herein include (1) context value tagging of goods and services; (2) an information and issuer system for context dependent valued goods & services; (3) context dependent electronic currency and coupons; (4) context dependent services using mobile devices; and (5) a context dependent electronic payment system. Additional systems are (6) a user, (7) government and (8) enterprise interfaces to the payment system, and (9) an ads insertion system.

According to an exemplary embodiment, there are six main components of the context based, or context dependent, value system. As shown in FIG. 1, there is context area 6, which is comprised of the intersection of the product value area 4 and currency value area 2. In an exemplary embodiment, the currency value area 2 and product value area 4 completely align and overlap, though this need not always be the case. According to other exemplary embodiments, there can be multiple product value areas 4, corresponding to multiple manufacturers, or producers, 12. Likewise, there can be multiple currency areas 2, serviced by multiple currency systems, described in greater detail below, though the multiple currency situation would generally not be implemented.

In addition to the creation of the context area 6, the other main components of the context dependent value system according to exemplary embodiments include a tagging system for value tagging of context dependent goods and services, an issuer system for issuing context dependent valued goods & services; a context dependent currency system for providing context dependent currency or coupons; and an electronic payment system, for facilitating the exchange of context dependent currency for context dependent products. Furthermore, there are additional components that can be included in the connect dependent value system according to further exemplary embodiments include a currency exchange system for users of the context dependent value system; a currency issuer system for governments and enterprises; an advertisement system; and a coupon issuer for producers/retailers.

For the remainder of this document, the discussion will focus on geography as the particular type of context. That is, instead of a "context based payment system", discussion will be focused on a "location dependent purchasing system" 100. Therein the particular type of context is geography, or locale. According to further exemplary embodiments, many other types of context are possible, such as time of day/date, temperature, distance, sound, among others. Discussions of these other types of context have been omitted for the dual purposes of clarity and brevity. Those of ordinary skill in the art can appreciate that other types of context are included in the various embodiments discussed herein. Thus, in the description below only the term location-based currency is used and described.

According to an exemplary embodiment, one or more organizations can implement or be responsible for implementing location dependent purchasing system 100. That is, a government can determine that it wants to promote a location based currency system, and either implement it itself, as the regulator of currency, or, "farm" out the project to a private enterprise that either receives revenue directly from the consumers, producers and/or retailer, or the government, or a combination of the two. In this manner the private enterprise is similar to what is occurring today at, for example, airports, and highway infrastructure, wherein private companies are building toll lanes and provide payments to the state and/or local governments and receive tolls from the users, i.e., commuters, to pay the government and earn a profit. According to a further exemplary embodiment, the organization that oversees implementation of the location dependent purchasing system can be referred to as location dependent purchasing system (LDPS) manager 200, and can be a government agency, a corporate government agency, a private enterprise, or any combination thereof. LPDS 200 would, therefore, be responsible for the implementation, care, and maintenance of any and all systems, facilities, equipment, and other devices associated with location dependent purchasing system 100.

Figure 2:
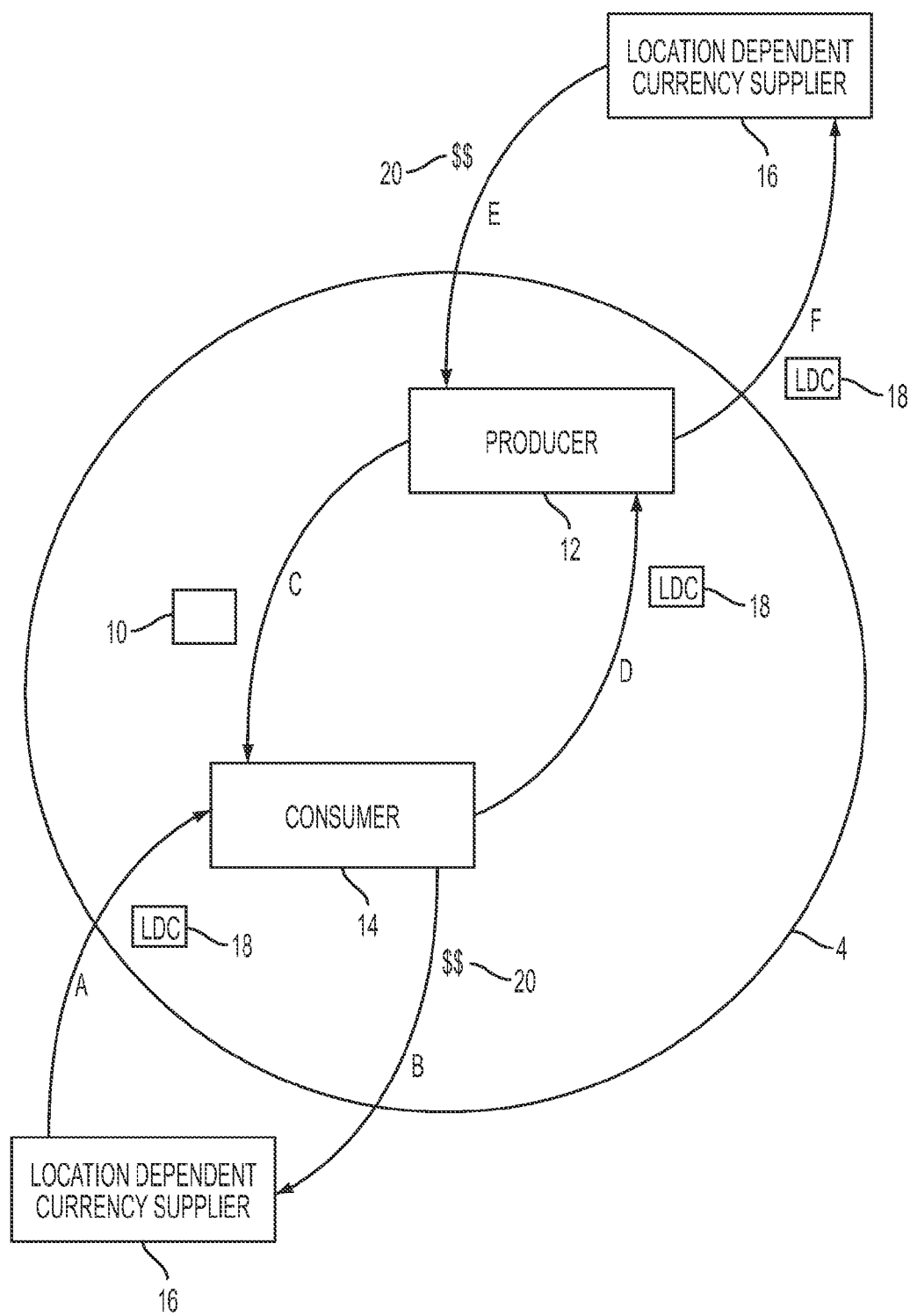
FIG. 2 illustrates an overview of a location dependent purchasing system and its interaction with a regular currency market system according to an exemplary embodiment.

According to an exemplary embodiment, an overall example solution is shown in FIG. 2. FIG. 2 illustrates an overview of a location dependent purchasing system and its interaction with a regular currency market system according to an exemplary embodiment. In FIG. 2, currency value area 2 and product value area 4 are shown as being perfectly overlapping, and for this special case, will be referred to as product value area 4. Within product value area 4 are located producer 12 and client/consumer (consumer) 14. Outside of product value area 4 is location dependent currency supplier 16, though of course physically, the location dependent currency supplier could be co-located with either of or both of producer 12 and consumer 14. According to further exemplary embodiments, location dependent currency supplier 16 can be located anywhere in the world.

As shown in FIG. 2, location dependent currency supplier 16 supplies location dependent currency 18 to consumer 14 (see arrow A), in exchange for regular currency 20 (see arrow B). According to an exemplary embodiment, regular currency 20 can only flow from consumer 14 to location dependent currency supplier 16, and not the other way. That is, consumer 14 cannot exchange location dependent currency 18 it has previously exchanged for regular currency 20, in a manner similar to how a diode operates in regard to current flow. As those of ordinary skill in the art can appreciate, diodes generally permit current to flow only in one direction, though, when a significantly large reverse voltage is applied, reverse current can flow. However, such irregular behavior does not take away from the general concept that a diode, in normal operation, allows current to flow in essentially one direction. So to in the exemplary embodiment of location dependent purchasing system 100: regular currency 20 can flow from consumer 14 to location dependent currency supplier 16, but not visa-versa.

Client 14 can then purchase products 10 (see arrow C) from producer 12 with location dependent currency 18 (see arrow 18) through operation of payment system 28 and currency server 26 as discussed in greater detail below. Producer 12 can now exchange location dependent currency 18 for regular currency 20 (arrows E and F) through use of location dependent currency supplier 16. According to a further exemplary embodiment, location dependent currency cannot be used by consumer 14 for anything but the purchase of new and/or authorized products 10 by authorized retailers 15 or producers 12. Again, in accordance with the concept of a diode, location dependent currency flows from consumer 12 to either or both of retailer 15 and producer 12, but not to other consumers 12, and also not to unauthorized retailers 15 and producers 12. That is, according to exemplary embodiments, there are no secondary markets or currency markets for location dependent currency 18, and the original obtainer of location dependent currency 18 is the only consumer allowed to use the location dependent currency 18 originally obtained by that consumer 18. However, as discussed above, retailer 15 and/or producer 12 can, by necessity and design, exchange the location dependent currency 18 that they have obtained by authorized transactions for regular currency 20. According to still further exemplary embodiments, however, retailers 15 and/or producers 12 cannot privately exchange location dependent currency between or amongst themselves, or use it in a private capacity (e.g., an owner of a store cannot use the location dependent currency obtained from a bona fide sales transaction to purchase authorized products for his or her own personal use).

Figure 3:
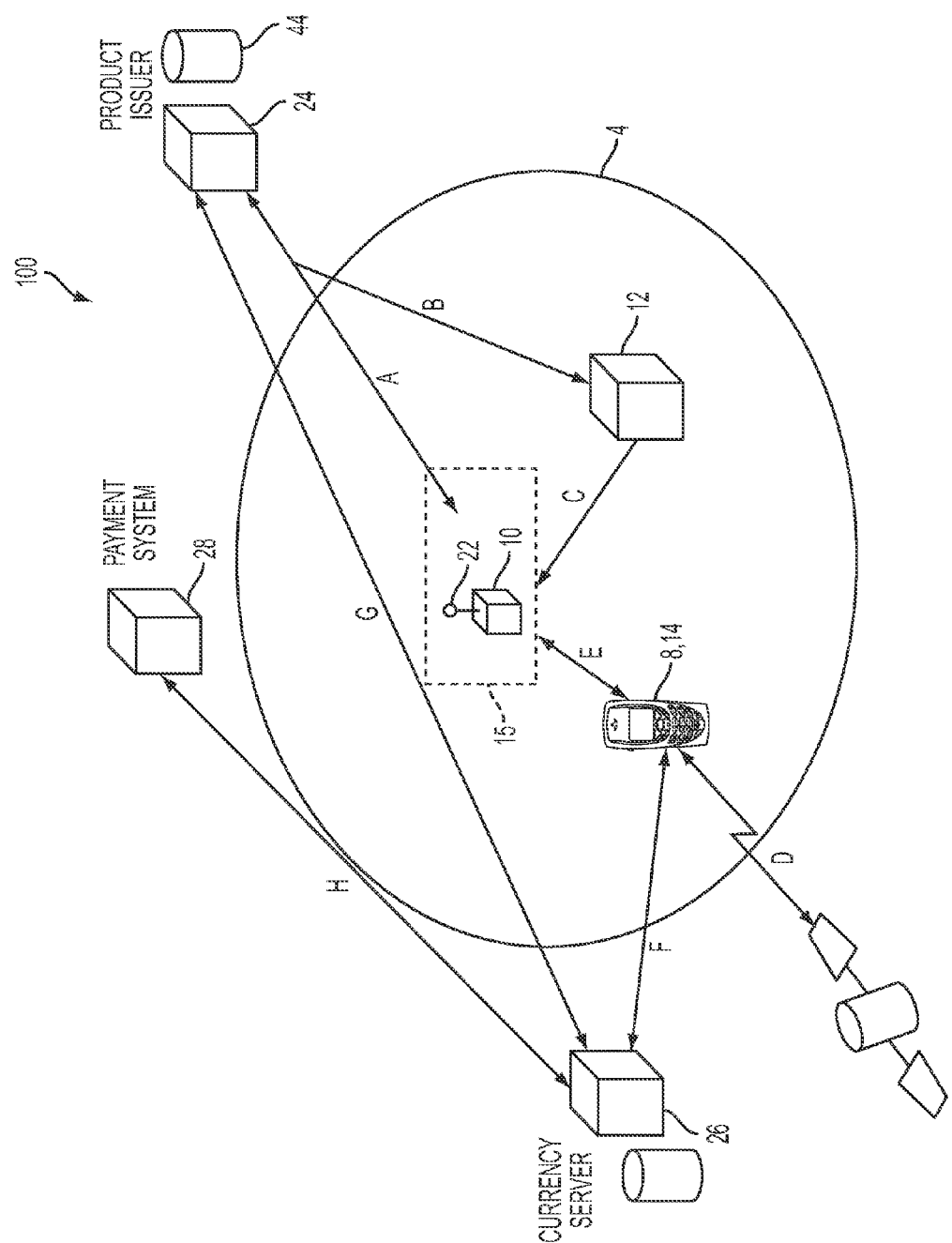
FIG. 3 illustrates a detailed version of location dependent purchasing system 100 according to an exemplary embodiment.

FIG. 3 illustrates a detailed version of location dependent purchasing system (LDPS) 100 according to an exemplary embodiment. In FIG. 3, the major components of LDPS 100 include: a secure location dependent tag 22 that contains information about product 10, producer 12, price, and its production position (or manufacturing site) and product value area 4; mobile device 8; currency server 26; payment system 28; and product issuer 24 (and database 44). Production position refers to the physical location in which product 12 was manufactured. Product value area 4 is the geographical area where the product can be bought using location-dependent currency 18. Product issuer 24 performs several functions, including certification and validation, as represented by arrow A, B. Certification is the process in which product issuer issues a certificate to a particular producer 12, so that when it learns of products 10 manufactured for sale by the producer 12, it can create individual tags 22 for each of the products 12, using the certificate. According to an exemplary embodiment, the certificate contains a unique number, assigned to one producer 12, but can also contain other information such as the type of products 10 manufactured by producer, and other such information that might be necessary for tracking product 10. When product 10 is ready to be offered for sale, or perhaps shipped to retailer 15 (arrow C) by producer 12, product issuer 24 performs a validation function wherein it registers the certificate, and learns where in the product value area, or which product value area (there can be more than one), each product 10 is being shipped to. A database of the certificates and validated products 10 is kept by product issuer 24, so that when a sale is contemplated, the product's authenticity can be verified and the sale within location dependent purchasing system 100 can occur.

Also shown in FIG. 3 is consumer 14 with mobile communication device 8, which is capable of global positioning system (GPS) navigation through the well-known use of GPS satellites 30. When consumer 14 is contemplating making a purchase of product 10, the location of consumer 14 is verified by GPS satellites (arrow D) and reported to payment system 28; payment system 28 can then allow the sale, if consumer 14 is a valid member of LDPS 100, and is within a proper product value area 4 for the product 10, as well as for location dependent currency 18.

While in product value area 4, consumer 14, using the mobile communication device 8, can read product tag 22 with the device to perform a purchase at retailer 15 location or the location of producer 12. Retailer 15 contains one or more of one or more types of products 10, as is customary in conventional markets. Currency server 26 performs the function of validating the position of consumer 14 as well as an available location dependent currency 18 balance of consumer 14. That is, currency server 26 verifies that consumer 14 and mobile device 8 are within a valid currency value area 2. Currency server 26, after communicating with payment system 28 and product issuer 24, informs consumer 14 as to whether the sale can be consummated (arrow F). The communication between currency server 26 and product issuer 24 (arrow G) includes a determination of whether producer 12, product 10, the price and product value area 4 are valid (product issuer 24 maintains the database discussed above for this purpose). Once validation of those items has occurred, then currency server 26 permits a sale, as discussed above, by consumer 14, by communicating with mobile communication device 8. Alternatively, the functions described in this paragraph can be performed by a point-of-sale (POS) terminal, e.g., when the product tag 22 is scanned at checkout and the consumer 14 provides identification that enables the POS terminal to verify the presence of sufficient location dependent currency 18 in the consumer's 14 account.

Figure 5:
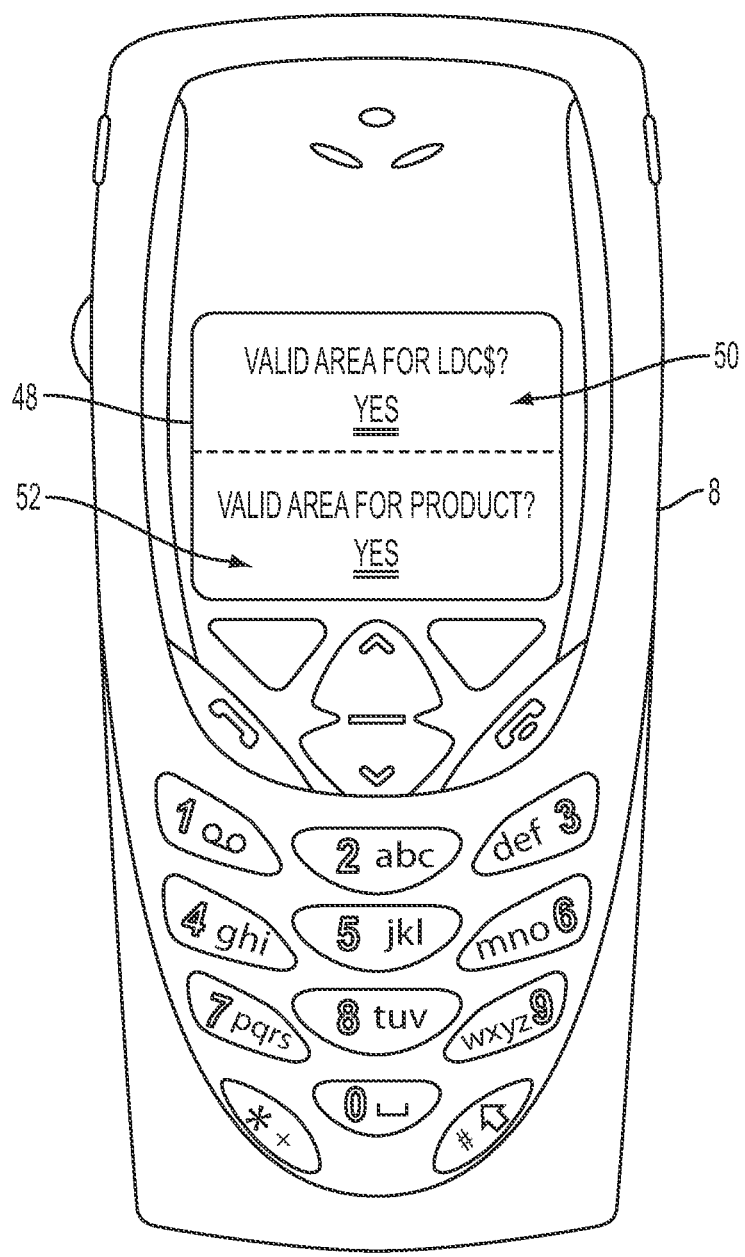
FIG. 5 illustrates a graphical user interface for a mobile device of a user/consumer indicating a currency valid area according to exemplary embodiments.

According to further exemplary embodiments, mobile device 8 can operate as an electronic wallet. That is, mobile device 8 can "carry" location dependent currency 18 for use by consumer 18. FIG. 5 illustrates a graphical user interface for mobile device 8 of a user/consumer 14 indicating a currency valid area according to exemplary embodiments. The carrying of electronic currency can either be physical, or symbolic. That is, actual electronic tokens can be stored in mobile device 8 that are consumed whenever a purchase is made, though their use would, according to exemplary embodiments, be fairly rare as they would be used only if communications to currency server 26 failed. In general, therefore, electronic currency would only be represented in mobile device 8. FIG. 5 shows two GUI's on display 48 of mobile device 8 that shows that consumer 14 is or is not in a valid area for location dependent currency 18 (i.e., currency value area 2; GUI 50), and also shows whether or not, if a purchase of a particular product was being considered, that mobile device 8 (and hence consumer 14) is in a valid product value area 4 (GUI 52). In FIG. 5, both questions are answered affirmatively, but that is not always the case. For example, consumer 14 could be in a valid currency valid area for his or her currency, but not in a valid product value area 4. In FIG. 5, though, GUI 50 shows consumer 14 that the mobile device 8 is in a valid currency value area 2, and how much location dependent currency is in the consumer's 14 location dependent currency bank account. Consumer 14 can then, if desired, use that information in making purchasing decisions.

Also shown in FIG. 3 is payment system 28, which with currency server 26, can effect payment of location dependent currency 18 to producer 12. Payment system 28 receives notification by currency server 26 that a payment can occur (arrow H), and payment system 28 then authorizes or causes a transfer of location dependent currency 18 from the account of consumer 14 to an account of producer 12. According to an exemplary embodiment, all location dependent currency accounts can be maintained in currency server 26. According to further exemplary embodiments, the functions performed by payment system 28 and currency server 26 can be combined, and further functions can be divested or accumulated in such device, as those of ordinary skill in the art can appreciate. Therefore, when a transfer of location dependent currency from a consumer's 14 account to a retailer's 15 or producer's 12 account occurs, the accounts are all located within currency serve 26, but authorization for the transfer originates from payment system 28 (arrow H). As discussed above, in regard to FIG. 2, and according to a further exemplary embodiment, if a sale occurs, and location dependent currency 18 is transferred from the account of consumer 14 to producer 12, a pay-out to producer 12 in regular currency 20 can also be enabled via payment system 28.

Figure 4:
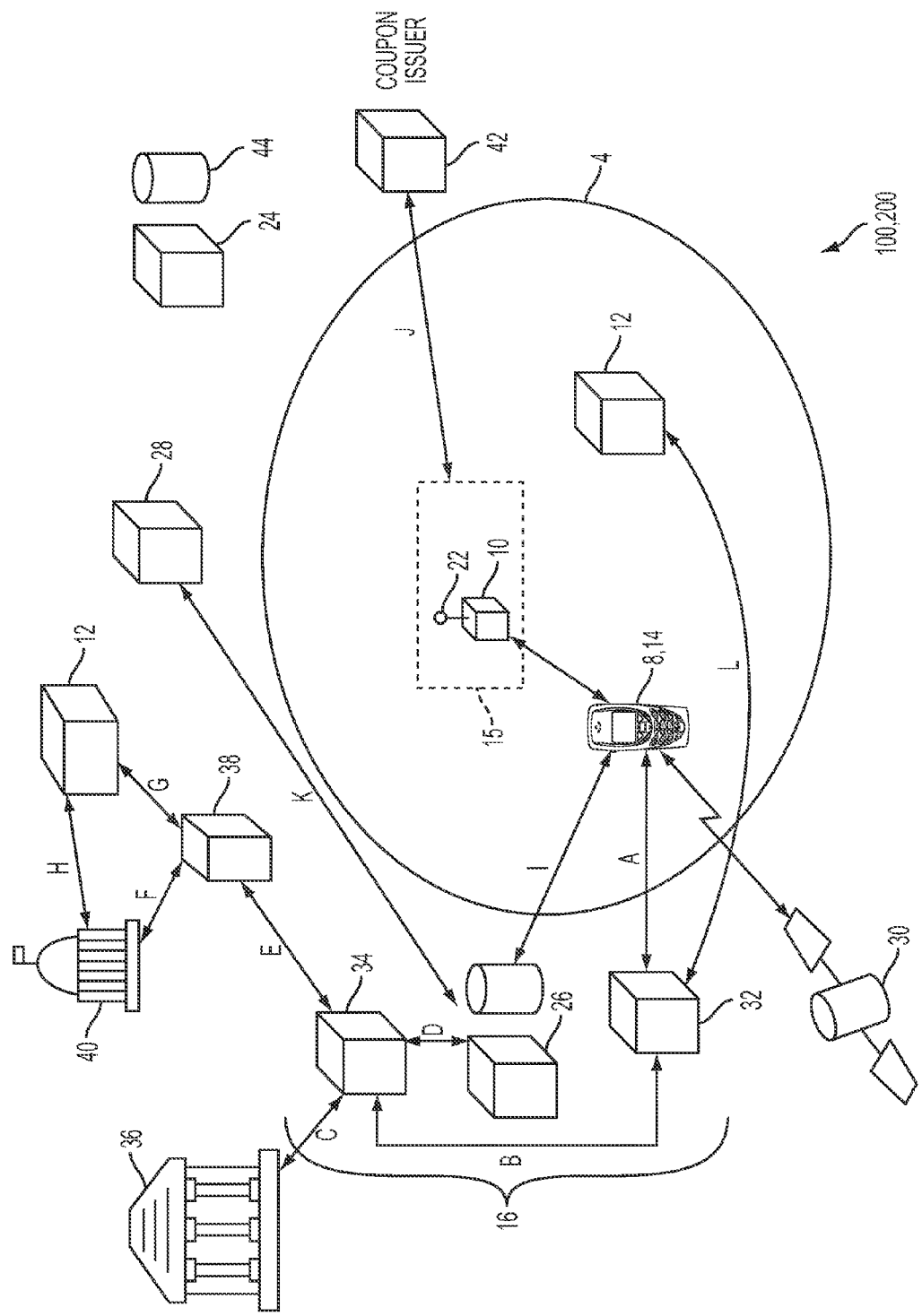
FIG. 4 illustrates additional features of the location dependent purchasing system according to exemplary embodiments.

FIG. 4 illustrates additional features of location dependent purchasing system 100 according to exemplary embodiments. FIG. 4 shows greater detail of how payments are made, and how coupons can be used in location dependent purchasing system 100. Location dependent purchasing system 100 further includes location dependent currency supplier 16, which includes currency server 26, currency exchanger 32, and currency issuer 34. Currency exchanger 32 allows consumer 14 to make a request to exchange regular currency 20 for location dependent currency 18 (arrow A). According to an exemplary embodiment, the exchange of currency can be performed at any time, from any location, as it occurs electronically, though, in an exemplary manner, the internet or other network systems are used, using consumer's 14 mobile device 8.

Currency exchanger 32 receives the exchange request (arrow A) from consumer 14 via mobile device 8, and forwards the request to currency issuer 34 (arrow B). Currency issuer 34 receives the exchange request from currency exchanger 32, and forwards the exchange request to bank 36 in order to enable regular currency 20 to be moved from an account of consumer 14 held in bank 36 (a regular savings, or checking account, or a credit/debit card account, or any type of account that contains regular currency 18, in any manner) to an account of LDPS manager 200. LDPS manager 200 can have one or more accounts held with one or more banks 36 that can be used to facilitate the exchange of regular currency 20 for location dependent currency 18. Location dependent currency 18 is thus received from LDPS manager 200 by currency issuer 34, and is then transferred to currency server 26 (arrow D). Recall that as discussed in FIG. 3, currency server 26 works with payment system 28 to move location dependent currency 18 and regular currency 20 between accounts of consumer 14 and producer 12.

As discussed above, LDPS manager 200 can be either a government enterprise, a private enterprise, or a combination thereof. According to an exemplary embodiment, it can be decided that location dependent purchasing system 100 should be self-sufficient, regardless of the true owners of it, and thus in order to fund operating expenses could keep a portion of each currency exchange transaction (charging consumer 14 directly), or LDPS manager 200 could charge the government a certain percentage of each transaction, wherein the government, and thus its citizens, provide the funding for operation via subsidies and taxes. According to further exemplary embodiments, there are many, if not incalculable, means for funding such a system, from completely government controlled to completely privately owned.

According to a further exemplary embodiment, location dependent currency 18 held in the location dependent currency account of the retailers 15 and producers 12 can be exchanged for regular currency. As discussed above, according to an exemplary embodiment, only retailers 15 and producers 12 can exchange location dependent currency 18 for regular currency 20. Retailers 15 and producers 12 can also have accounts in currency server 26, to receive location dependent currency 18 from consumers 14 following a valid purchase. Then, location dependent currency supplier 16 can, upon a request by the retailer 15 and/or producer 12, cause an exchange of location dependent currency 18 for regular currency 20. The request can occur automatically, or only upon certain events (such as reaching a threshold amount of location dependent currency 18), or upon certain time intervals (i.e., at the end of each day, week, month, among others). Exchanging location dependent currency 18 for regular currency 20 for retailers 15 and/or producers 12 occurs similarly to the exchange of regular currency 20 for location dependent currency 18 for consumers 14. Currency exchanger 32 receives the location dependent currency 18-for-regular currency 20 exchange request (arrow L) from, by way of a non-limiting example, producer 12, and forwards the request to currency issuer 34 (arrow B). Currency issuer 34 receives the location dependent currency 18-for-regular currency 20 exchange request from currency exchanger 32, and forwards the location dependent currency 18-for-regular currency 20 exchange request to bank 36 in order to enable regular currency 20 to be moved from an account of LDPS manager 200 held in bank 36 to an account of the retailer 15 and/or producer 12. As discussed above, LDPS manager 200 can have one or more accounts held with one or more banks 36 that can be used to facilitate the exchange of regular currency 20 for location dependent currency 18, as can retailers 15 and producers 12. Further, during the transfer of regular currency 20, a percentage can be kept by LDPS manager 200 to cover operating expenses, and generate profit, as discussed above.

Currency insertion system 38, also shown in FIG. 4, permits the insertion of location dependent currency 18 to any individual consumer's 14 account (arrow E). In this manner, according to an exemplary embodiment, a government (or any other entity) can promote the use of location dependent purchasing system 100 by providing "cash" incentives, rebates, coupons, or simply gifts to motive people (consumers 14) to use the system. For example, a government 40 that taxes citizens' income, can offer tax refunds in the form of a location dependent currency 18 at a rate of 1.1 (i.e., if a consumer were to expect a $1.00 tax refund, they instead could get $1.10, in location dependent currency 18, instead of regular currency 20; arrow F). Or, by way of another example, an independent entity, for example a producer 12 of some home appliance product 10, could offer incentives to purchase a locally manufactured, low-$CO_2$ footprint product and give consumers 14 a $100 location dependent coupon (the use of which will be discussed in greater detail below; arrow G), for which the government gives the producer 12 a tax incentive worth $1 for each $100 coupon that is used (arrow H).

According to further exemplary embodiment, the purchasing history by some, any or all consumers 14 can be stored in location dependent purchasing system 100 via currency server 26 (arrow I), enabling powerful ads insertion in consumers' 14 mobile communication device 8. Also shown in FIG. 4 is coupon issuer 42, which can create relationships with any or all of producers 12, government 40, banks 36, or even other consumers 14 to prepare and issue coupons for use in location dependent purchasing system 100 to provide an incentives in the form of issued coupons (arrow J) to (a) use the system 100, and/or (b) to purchase a particular product. According to further exemplary embodiments, coupon issuer 42 can issue the coupons to mobile communications device 8 at the point of sale, i.e., when a product 10 is being purchased, or sent directly to mobile communications device 8 at other times.

Having provided a summary of each of the major components of location dependent purchasing system 100, a detailed discussion of their operation shall now be provided.

Location Value Tagging

One of the first steps in implementing location dependent purchasing system 100 is to provide location value tagging of the good and services, or products 10. That is, when introducing a new product 10 into location dependent purchasing system 100 it can be tagged with location-dependent information, and that information is "contained" in a unique product identification number (product ID). According to exemplary embodiments, all products 10 offered for sale in location dependent purchasing system 100 have a tag 22 attached to them, printed on them, or affixed to them in some manner. The unique product ID can then be read, either manually or automatically (i.e., bar code mechanism) that is located in product ID database 44 maintained by product issuer 24. As discussed briefly above, when a purchase is contemplated, currency server 26 receives information from consumer 14 regarding the contemplated purchase, and this includes the unique product ID which is then communicated to product issuer 24 which finds the unique product ID in its product ID database 44, and finds the relevant information about the product 10 that matches the unique product ID it just received.

Because each product 10 is assigned a unique product ID that uniquely identifies it, specific information about the product 10 can be quickly and easily obtained. According to an exemplary embodiment, in location dependent purchasing system 100, wherein the context is limited to geographical position alone, the unique product ID will at a minimum identify the product value area(s) 4 that the product 10 it is associated with can be sold. Thus, a particular tag 22 for a particular product 10 ties the product 10 to one or more product value areas 4. In addition, according to further exemplary embodiments, product ID database 44 can also contain one or more of the following information: producer 12, production position, price, coupons (if applicable), and other information that might be useful or necessary, as determined from time-to-time.

According to exemplary embodiments, tag 22 can use a security mechanism (e.g. encryption) to protect the information. According to a further exemplary embodiment, the information placed securely on tag 22, should preferably be issued by product issuer 24, and not by producer 12 or retailer 15. Once the product value area 4 information is obtained and verified, i.e., that the sale is permitted, price and other information can be obtained, either from retailer 15, or product issuer 24, is used, and if the sale completed, all of that information is returned via a network to product issuer 24 to update product ID database (which can in an exemplary embodiment, track sales). As those of ordinary skill in the art can appreciate, such network communications can be accomplished in a secure manner, by wired or wire-less means, or any combination of secure, non-secure, wired and wire-less means.

According to further exemplary embodiments, tags 22 that can be used for tagging of products 10 include any electronic or printed tags that can store the unique product ID. Example of such electronic tags include, among others, NFC tags or RFID tags. In one exemplary embodiment, mobile communication devices (mobile devices) 8 need to be able to read electronic tags 22. According to further exemplary embodiments, it is also possible to use printed paper tags that are 1D barcodes or two-dimensional codes such as QR-codes. According to further exemplary embodiments, there exist also other visual tags using at least one or more of colours, images, and other forms. Tags 22 that use these more "visual" means of storing and conveying information can be read with a camera or an infrared scanner on mobile device 8.

Product Value Area 4

As defined above, product value area 4 is the geographical area where product 10 can be bought/sold using location-dependent currency 18. According to a further exemplary embodiment, product value area can be a well-defined shape (e.g., circle), or it can be defined by one or more of zip code areas, physical territorial features (between river A and River B, and the shore), political borders (country, city, county, among others), or by a distance from a specific point. According to further exemplary embodiments, product value area 4 can have other features. For example, the price of product 10 could be dependent on the distance from the production position or dependent on where in product value area 4 it is offered. Product value area 4 can also just be certain buildings, or geographical spots, or could depend on other context such as time, day, among other context-attributes.

Product Issuer 24 for Location Dependent Purchasing System 100

As discussed above, product issuer 24 performs at least the functions of certification and validation. Certification is the process in which the product issuer 24 issues a certificate to a particular producer 12, so that when it learns of products 10 manufactured for sale by the producer 12, it can create individual tags 22 for each of the products 12, using the certificate. According to an exemplary embodiment, the certificate contains a unique number, assigned to one producer 12, but can also contain other information such as the type of products 10 manufactured by producer, and other such information that might be necessary for tracking product 10. For example, if a first producer is the Acme Manufacturing Co., it could be assigned a certificate no. of 001-001.

When product 10 is ready to be offered for sale by producer 12, or perhaps shipped to retailer 15 by producer 12, product issuer 24 performs a validation function wherein it registers the product 10 against the certificate, and learns where in the product value area, or which product value area (there can be more than one), each product 10 is being shipped to. Then, a unique product ID is assigned to the product, that in an exemplary embodiment will contain the certificate number of the producer as well as a unique part that pertains to that product 10 alone. For example, suppose Acme Manufacturing Co. produces a widget, and the widget is assigned a unique number 7777, then the unique product ID would be 001-001-7777. A database of the certificates and validated products 10 is kept by product issuer 24, so that when a sale is contemplated, the product's authenticity can be verified and the sale within location dependent purchasing system 100 can occur.

In the tagging process, i.e., when a tag 22 is generated for each product 10, the tag printing (or writing) unit communicates in a secure manner to product issuer 24. According to exemplary embodiments, the secure connection is performed using any of several security methods that can use soft or hard tokens. Product issuer 24 verifies that the certificate number is correct for the producer that wants to create tags 22 (similar to an individual logging into a checking account; he or she may have to provide the account number, or some other identifying indicia), and the tag printer can then be connected to the product issuer ID database and register new unique tag numbers.

According to an exemplary embodiment, information stored in product ID database 44 includes at least product value area 4 information, as well as information about the product that can include at least a short or more detailed description, the producer ID (i.e., certificate number), the unique product ID, production position, among other types of information. According to an exemplary embodiment, producer 12 can also create a database (i.e., the producer database), which also contains information similar to that of the product ID database 44. If the production position and the production value area 4 does not change for any of the products 10 produced by producer 12, such information can be omitted from producer ID database 44, as it would be essentially defined by the certificate ID. Other product information, such as price, size, name, among other types of information, could be stored with the product ID in product ID database 44. According to further exemplary embodiments, the product information, which includes at least the product ID, is then securely protected and written or printed to tag 22, depending on whether it is an electronic tag or a printed paper tag.

Location Dependent Currency 18

A significant aspect of the implementation of location dependent purchasing system 100 is use of location dependent currency 18. In the location dependent purchasing system 100, location dependent currency 18 can only be used to purchase location dependent products 10. Location dependent currency 18 is defined as electronic money in which the value depends on location. According to a further exemplary embodiment, the value could depend on a formula, for example, the distance from a certain position. The simplest form is that location dependent currency 18 has its fixed value inside a certain area. As discussed above, a currency value area 2, defined as an area within which location dependent currency 18 has value, can be the same as, or different from, product value area 4. According to further exemplary embodiments, currency value area 2 can have the same characteristics as product value area 4 as described above.

According to further exemplary embodiments, location dependent currency 18 could be defined to be valid according to a context different than location. The value of currency 18 could dependent upon time of the day, a certain day, the temperature, any combination of these, or other parameters. For example, according to an exemplary embodiment, between 0800 and 1200 on a given day, location dependent currency 18 could be given a first value of X at a first retailer 15 or producer 12. From 1200 through 1700, location dependent currency 18 could be given a value of Y, and from 1700 through 2200, a value of Z, wherein X>Y>Z. Thus, this particular retailer, by assigning more value to the location dependent currency 18 earlier in the day, is attempting to motivate consumers 14 to shop earlier, when the stores are typically less crowded. According to a further exemplary embodiment, currency 18 could only become valid, or obtain additional value, if a pre-condition were satisfied. Still further, the value of currency 18 could be dependent upon the utterance of a password; if the password is spoken, then the currency could either be enable to have value, or it could change its value. According to a further exemplary embodiment, location dependent currency 18 has value only in the vicinity of mobile device 8. Thus, in order for a particular consumer's 14 location dependent currency 18 to be usable, that consumer's mobile device 8 needs to be inside product value area 4. For example, if retail store 15 offering product 10 is a short distance from producer 14 within product value area 4, then when consumer 14 is in retail store 15 location dependent currency 18 is usable for paying for products 10.

According to a further exemplary embodiment, currency value area 2 and product value area 4 do not necessarily need to align or even overlap to allow a purchase to be made according to an exemplary embodiment. For example, mobile device 8 is not inside product value area 4, but is with consumer 14 at home while shopping online. According to an exemplar embodiment, consumer 14 may still be allowed to user location dependent currency 18 to make the purchase because currency value area 2 is given a constructive presence within the product value area 4 that corresponds to the product for sale, because, in this instance, a purchase made over the internet reduces $CO_2$ emissions by consumer 14, or because the residence of the consumer 14 is close enough to the product value area 4.

According to still a further exemplary embodiment, there is a currency value area 2 only at certain points or spots. Restricting currency value area 2 to such locations enables location dependent purchasing system 100 to allow for purchases only in certain stores or for certain products.

Location Dependent Purchasing Service

The use of the location dependent currency 18 is enabled by a purchasing service with a client and hardware in mobile device 8 and currency server 26. As those of ordinary skill in the art can appreciate, "client" refers to either software or hardware, or a combination of both, to give effect to certain defined function. Thus, even though there is a "separate" software package, or application within mobile device 8 that performs the "client" operation, reference shall only be made to mobile device 8.

According to an exemplary embodiment, mobile device 8 performs the function of currency validation, location reading, and product tag reading. Mobile device 8 implements these capabilities using regular embedded trusted environments such as SIM card, the NFC embedded function or an embedded trusted software. According to an exemplary embodiment, mobile device 8 verifies its position continuously or at the moment of tag reading. Tag reading is performed using the electronic tag readers or the camera in mobile device 8 as described before. The location of mobile device 8 can be derived from a GPS system within mobile device 8, or in other methods known to those of ordinary skill in the art, such as Wi-Fi-ID, or cell-ID look-up, the tag reading itself (i.e., tag 22 provides location information), or by network based positioning.

Regardless of how location information is derived, it and the information from tag 22 is provided by mobile device 8 to currency server 26 over a secure connection to verify that that the position is valid for purchase, and to further determine if consumer 14 has sufficient location dependent currency 18 to cover or afford the purchase. According to a further exemplary embodiment, the position validation process can be initiated by consumer 14 simply by reading tag 22. Position validation, therefore, means verifying that the product value area 4 of a particular product 10 matches or corresponds to a particular currency value area 2. If tag 22 contains more information than just product ID, such as producer 12, price, production position, product value area 4 (product ID can be used to obtain product value area 4, among other items of information, e.g., by communicating with product issue 24, though tag 22 can contain additional information), and other information, it can be presented to consumer 14 in a GUI on mobile device 8 to support the buying process. Alternatively, if tag 22 only contains the product ID, whatever information that might be stored in product ID database 44 in product issuer 24 can be sent back to mobile device 8 to be presented in the form of a GUI to support the buying process.

Validation of the position is done by matching currency value area 2 with product value area 4. Currency server 26 securely connects with product issuer 24 to validate the product ID. If producer 12 and the product ID are certified and valid, the production position, product value area 4, the price and other needed information are sent back or confirmed to be used in the position validation process.

Currency server 26 contains a database of all consumers' currency accounts. The amount of currency needed for the transaction is validated against the consumer's location-based currency account in currency server 26. The process of verifying sufficiency of funds creates an account statement. A positive account statement means that there is a sufficient amount of location dependent currency 18 available to support the purchase. A negative account statement means that there is not enough location dependent currency 18 available to support the purchase. The validation of the position and a positive account statement then initiates payment of product 10. According to an exemplary embodiment, all of the information is sent back to consumer 14 to be verified and to wait for a final authorization before payment is made by payment system 28; this information can be displayed in the form of a GUI to consumer 14. According to a further exemplary embodiment, pre-authorization occurs when initiation of the purchase is made, and thus the information sent back to consumer 14 by payment system 28 is in the manner of a "receipt" that confirms the purchase information.

Payment System 28 for Location Dependent Currency 18

As discussed above, once the product value area 4 and currency value areas 2 are validated, a purchase can occur. The actual purchase, or exchange of location dependent currency, can be performed securely via payment system 28 according to an exemplary embodiment. The amount of location dependent currency 18 according to the price of the product(s) is then withdrawn from the consumer's account and moved to the producers or retailers account in payment system 28. This exchange is shown in FIG. 4 by arrow K. Arrow K represents the exchange of information from currency server 26 to payment system 28, authorizing the transfer of location dependent currency 18.

According to further exemplary embodiments, a transfer of regular currency 20 to either or both of producer 12 and retailer 15 can be initiated by payment system 28. The transfer of regular currency 20 for location dependent currency 18 can be done substantially instantaneously, or at pre-determined intervals, such as at the end of each day, once a week, and once a month. These intervals can be pre-determined, by either or any of payment system 28, retailer 15, and producer 12.

Currency Exchanger 32

Currency exchanger 32 supports consumers 14 to exchange regular currency 20 to location dependent currency 18. Currency exchanger 32 can receive instructions from consumer 14 securely through a GUI in mobile device 8, or via a secure web-page, to initiate the move of money from a regular bank account (held in bank 36) or a credit card to the consumer's 14 location dependent currency account held in currency server 26. Currency exchanger 32 communicates the exchange request to currency issuer 34 that is connected to regular bank 36.

Currency Issuer 34

As shown in FIG. 4, according to further exemplary embodiments, currency issuer 34 is connected to regular banks 36 to support location dependent currency 18. According to further exemplary embodiments, regular currency 20 from a bank account in bank 36 is used to issue a corresponding amount of location-based currency 18 in a user's location dependent currency account in currency server 26.

Currency Insertion System 38

Currency insertion system 38 allows governments 40 and private enterprises to insert location dependent currency to consumers when desired (arrows F and G, FIG. 4). According to an exemplary embodiment, governments 40 private or enterprises can connect to currency issuer 38 either provide location dependent currency 18, or to accept regular currency 20 in exchange for location dependent currency 18 to any consumer's account (held in currency server 26).

Coupon Issuer 42 and Advertisement System

According to a further exemplary embodiment, an additional useful feature is location dependent coupons 44 that can be used only with location dependent currency 18 for location-based products 10. The producer 12 and/or retailer 15 can enter into an agreement with coupon issuer 42 to produce coupons. Coupons can be either physical location dependent coupons 44 that are produced the same way as product tags 22 are made, or coupons can be virtual location dependent coupons 44 that are managed in a manner which is substantially similar to location dependent currency 18.

According to an exemplary embodiment, location dependent coupons 44, whether virtual or real, contain, or can include a link or path to a database entry that can contain, certain information that can include at least a unique coupon identification number (ID), the product ID, product value area 4, and a value or rebate. If location dependent coupon 44 is applicable for all products 10 manufactured by producer 12, the producer ID is also needed. Additional information such as production position, product name, retailer name, size, quality, among other items of information, can also be stored in location dependent coupon 44, or retrieved from coupon issuer 42.

Coupon issuer 42 validates producer 12 and product 10 when location dependent coupon 44 is made, just as when product 10 is manufactured, and producer 12 obtains a certificate for each product 10. Coupon issuer 42 contains a database for all location dependent coupons 44. According to an exemplary embodiment, when consumer 14 attempts to purchase product 10 for which there is an associated location dependent coupon 44, currency server 26 recognizes that there is a location dependent coupon 44, and either reads the information provided by location dependent coupon 44, or obtains the information from the database at coupon issuer 42. Currency server 42 then validates location dependent coupon 44, i.e., verifies that it is valid (e.g., must be used on or before a certain date, and/or with a certain product, and within a certain product value area 4), before the price reduction is made in the purchase and payment is made to producer 12 and/or retailer 15.

According to a further exemplary embodiment, the purchasing history of consumer 14 can be stored in a database. Location dependent purchasing system 100 can provide receipts and account statements for one or more consumers, and this purchasing history can be used by producers 12, retailers 15, and/or coupon issuers 42 to enable a location-based ads insertion function in the purchasing service for location dependent products 10.

Location dependent purchasing system 100 provides a context dependent alternative market according to exemplary embodiments. Mobile device 8, which provides, in an exemplary embodiment, GPS-based positioning information, as a means by which it is substantially impossible to purchase products 10 with location dependent currency 18 at any other places other than those certified. Product issuer 24 controls certificates 21 and tags 22 and therefore secures the location information of any product 10 offered for sale within location dependent purchasing system 100, making it substantially impossible to offer the product 10 for location based currency 18 at any other places than certified, i.e., the production value area 4.

According to further exemplary embodiments, currency issuer 34 secures the exchange of regular currency 20 to location dependent currency 18 for consumers 14, governments 40 and private enterprises, and therefore substantially prevents other currencies from entering the alternative market.

According to additional exemplary embodiments, payment system 28 enables the exchange of payments with location dependent currency 18 to regular currency 20 hence making it possible for producer 10 to monetize the local production value in addition to product values like brand, quality, taste, design, among other marketing advantages. The purchasing history of location dependent products 10 enables a more precise ads insertion system only for location dependent products 10 and consumer 14 interested in locally produced products.

According to further exemplary embodiments, coupon issuer 42 controls the production of location dependent coupon 46, and therefore secures the position and value information making it substantially impossible to use the location dependent coupon 46 for non-location dependent products and at places other than certified.

Figure 6:
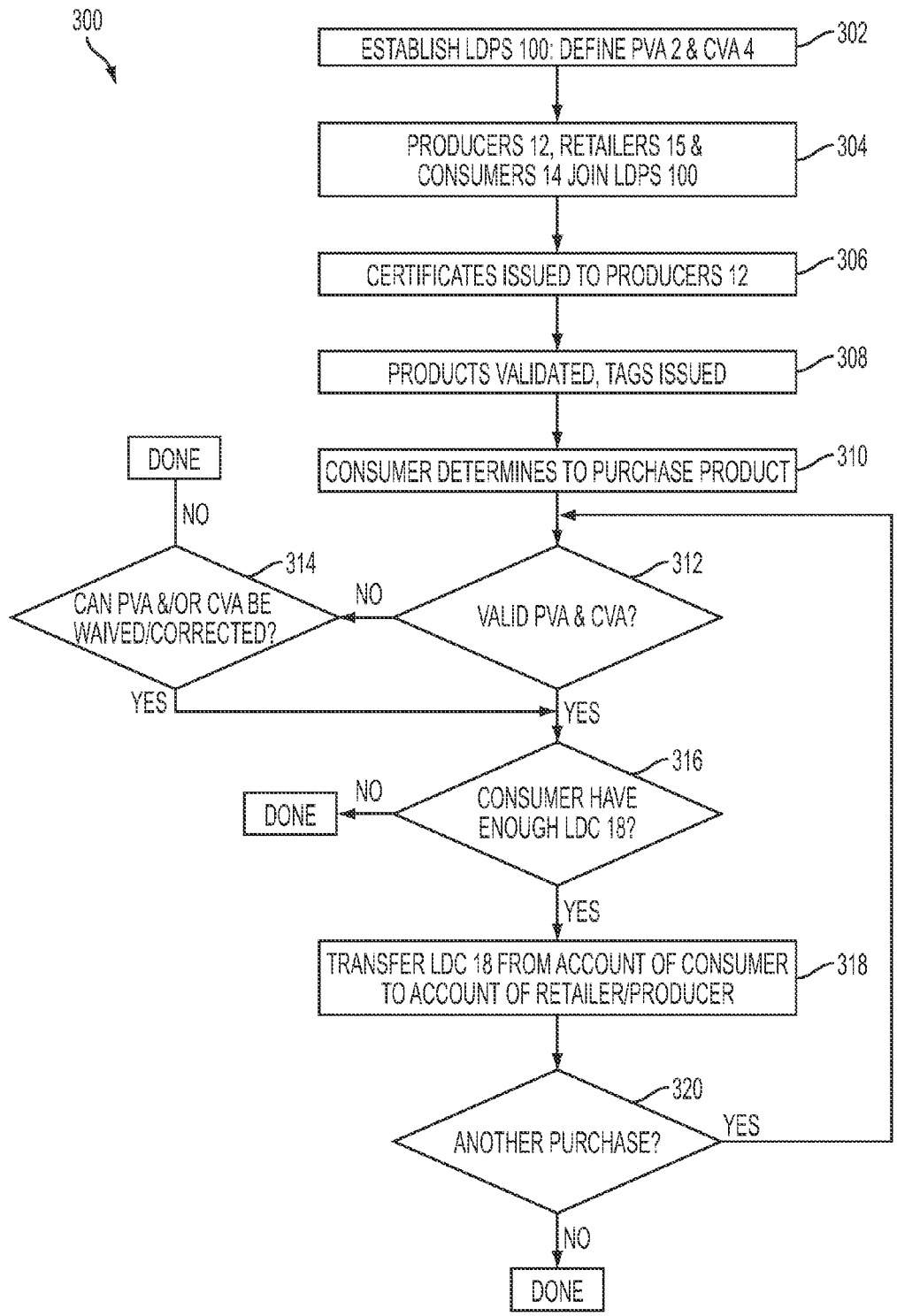
FIG. 6 illustrates a method for implementing and using a location dependent purchasing system 100 according to an exemplary embodiment.

FIG. 6 illustrates a method for implementing and using a location dependent purchasing system 100 according to an exemplary embodiment. In method 300, either a private enterprise, government entity, or some combination thereof, referred to as LDPS manager 200, implements location dependent purchasing system 100 by creating and defining one or more purchase value areas 2, and one or more currency value areas 4, shown in step 302, along with payment system 28, currency server 26, the other apparatus discussed in detail above. In step 304, one or more producers 12, retailers 15 and consumers 14 join location dependent purchasing system 100. Product issuers 24 create and issue certificates for each producer 12 (step 306), and in step 308, when producer 12 manufactures or produces products 10, the products 10 are validated and tags 22 are issued for each product 10. Thus far, steps 302-308 describe generally how location dependent purchasing system 100 is created and implemented. The remaining portions of method 300 discuss generally how location dependent purchasing system 100 is used by consumers 14, producers 12, and retailers 15 according to an exemplary embodiment.

In step 310, a consumer 14 has made a determination to purchase one or more products 10 from a retailer 15 or producer 12. According to an exemplary embodiment, location dependent purchasing system 100 can use mobile device 8, perhaps in the form of an electronic wallet as discussed above, to determine if the product 10 being offered for sale is in a valid purchase area 2, and whether consumer 14 is in a valid currency area 4 (decision step 312). If both of these inquiries can be answered in the affirmative ("Yes" path from decision step 312), then location dependent purchasing system proceeds to verify whether consumer 14 has sufficient location dependent currency in the consumer's account (kept in currency server 26).

If, however, consumer 14 is not in a valid currency value are 4 and/or the product 10 is not being offered for sale in a valid product value area 2, or is not a valid product 10 for the product value area 4, location dependent purchasing system 100 according to an exemplary embodiment can attempt to waive or correct the condition in decision step 314. Such waiver or correction can take the form of an additional payment, a special exemption for certain reasons (age, disability, veterans' preferences, among other reasons), and if so ("Yes" path from decision step 314), then method 300 can proceed to decision step 316. If the waiver or correction cannot occur ("No" path from decision step 314 (on occasion there are changes to valid currency value areas 2, or a consumer may have faulty information associated with their electronic wallet, hence the need to make a correction from time-to-time of either or both product value areas 4 and currency value area 2), then the transaction cannot be consummated and method 300 is terminated, meaning no sale at this point occurs.

Returning to decision step 316, if consumer 14 does not have enough location dependent currency 18 ("No" path from decision step 316), then method 300 again terminates, meaning that again the transaction cannot be consummated. If, however, there is sufficient location dependent currency 18 in the consumer's 14 location dependent currency account (at currency server 26; "Yes" path from decision step 316), then the agreed upon amount of location dependent currency 18 is withdrawn from the consumer's account and transferred to the retailer's 15 or producer's 12 location dependent currency 18 account at currency server 26. According to further exemplary embodiments, LDPS manager 200 can deduct a certain portion of the exchange price, in either location dependent currency 18, or when producer 12 or retailer 15 requests an exchange from location dependent currency 18 to regular currency 20, LDPS manager 200 can deduct a portion in regular currency 20. Once the purchase is verified, the correct amount of location dependent currency 18 is deducted from the account of consumer 14, and consumer 14 takes the product 10 (or service). Then, consumer 14 can determine whether or not to make another purchase, as shown in decision step 320. If consumer does not want to make another purchase ("No" path from decision step 320), method 300 terminates. If consumer 14 does want to make another purchase ("Yes" path from decision step 320), then method 300 returns to decision step 312 to again ascertain whether or not the new product 10 desired to be purchased is in a valid product value area 4, and whether the consumer 14 is in a valid currency value area 2. According to further exemplary embodiment, it is possible that, for a first given product 10, a consumer's 14 location dependent currency 18 could be invalid, but for another given product 10, the location dependent currency 18 would be valid.

Figure 7A:
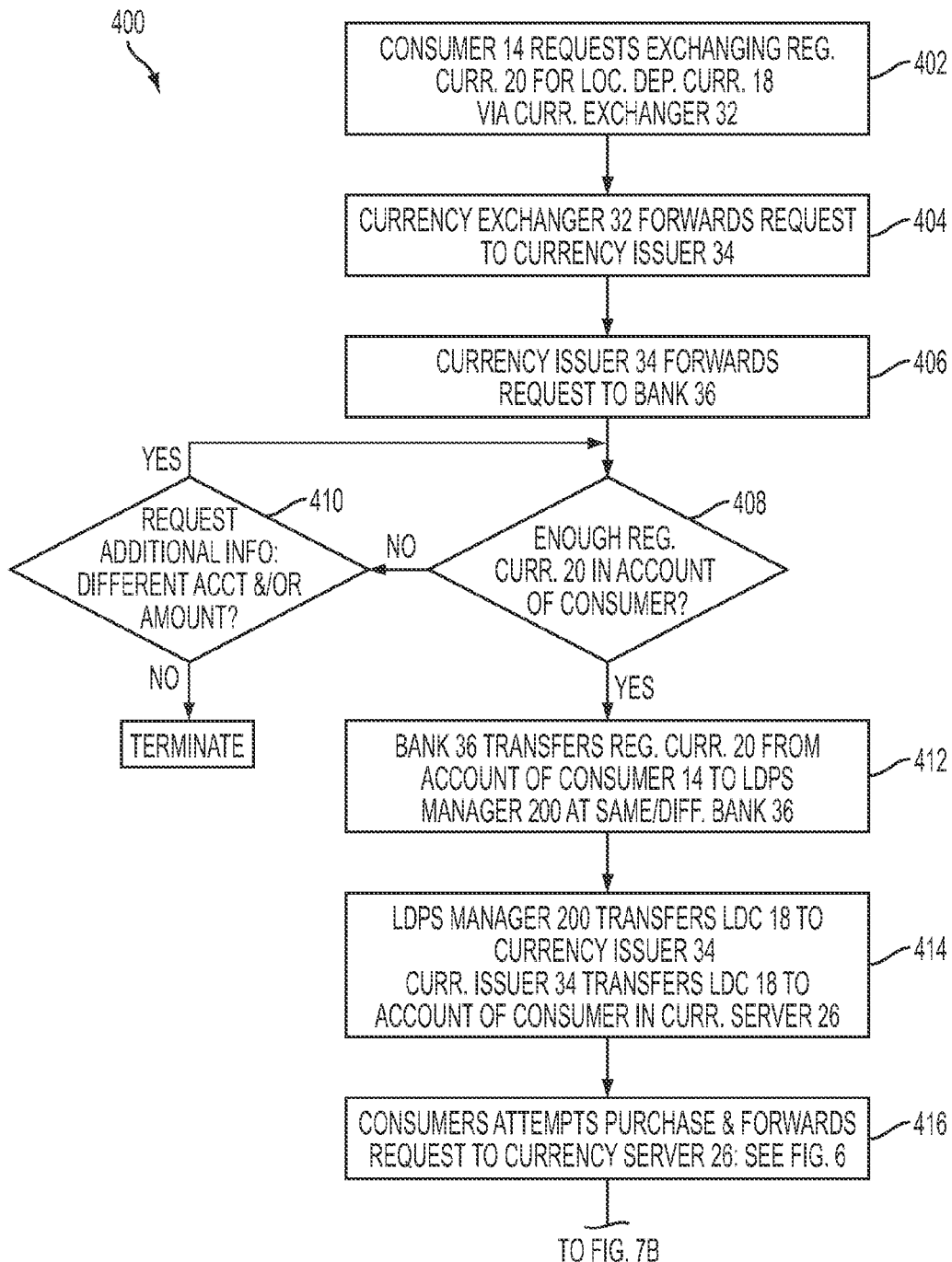
FIGS. 7A and 7B illustrate a method for exchanging regular currency 20 for location dependent currency 18 on behalf of consumers, and also for exchanging location dependent currency 18 for regular currency 20 on behalf of producers and retailer, according to an exemplary embodiment.
Figure 7B:
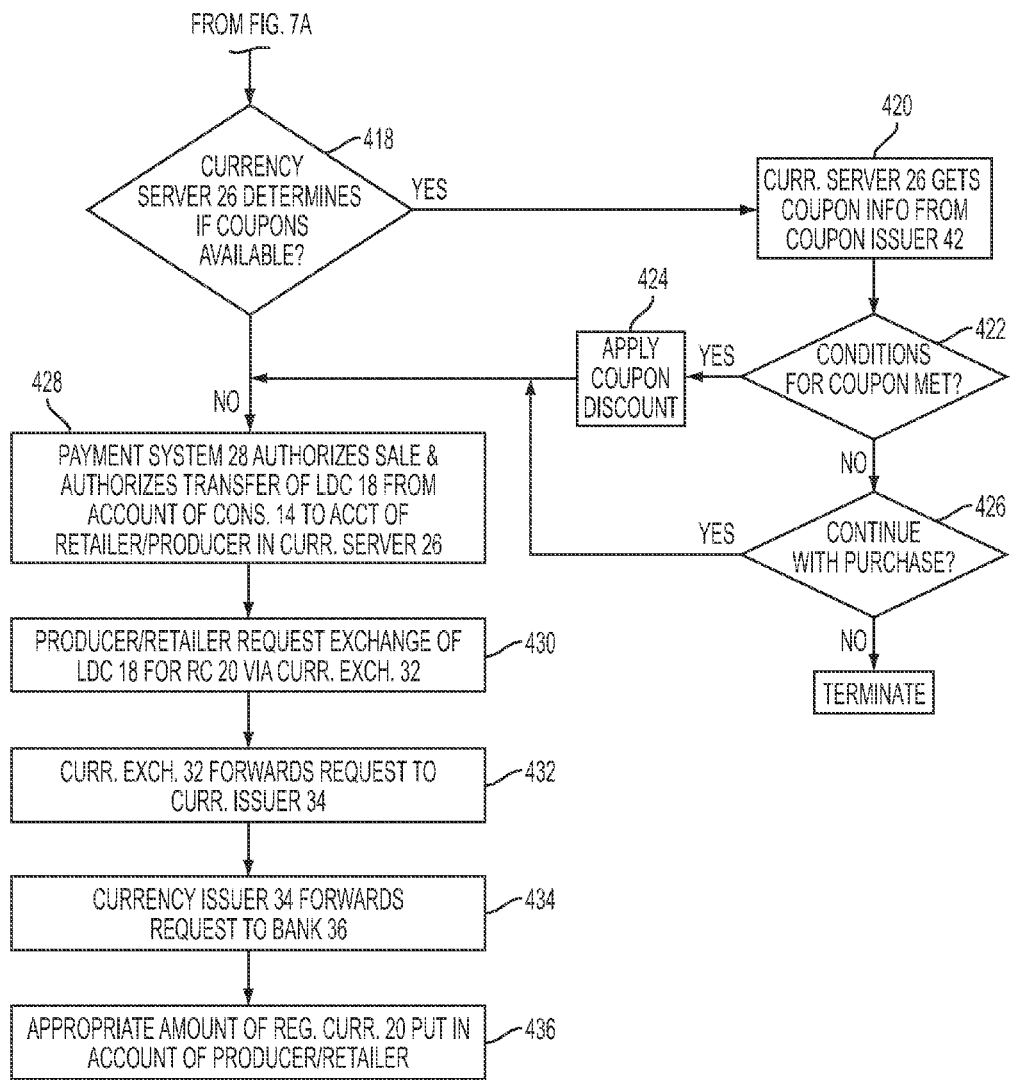

FIGS. 7A and 7B illustrate a method for exchanging regular currency 20 for location dependent currency 18 on behalf of consumers, and also for exchanging location dependent currency 18 for regular currency 20 on behalf of producers and retailer, according to an exemplary embodiment. Method 400 begins with step 402 wherein consumer 14 makes a request to exchange regular currency 20 for location dependent currency 18 via currency exchanger 32, as shown in FIG. 4. Currency exchanger 32 then forwards the request from consumer 14 to currency issuer 34. As discussed in greater detail above, however, currency server 26, currency exchanger 32 and currency issuer 34 need not be separate entities, but can be combined in one or two entities, for example servers, or the three entities 26, 32 and 34 can be dispersed among four or more different devices such as servers, and still encompass the various exemplary embodiments.

In step 404, currency exchanger 32 forwards the request from consumer 14 to currency issuer 34. Currency issuer 34 then forwards the request to bank 36 in step 406. In decision step 408, bank 36 determines whether there is enough regular currency 20 in the account of consumer 14 to make the exchange. If there is not enough regular currency 20 to make the requested exchange ("No" path from decision step 408), method 400 proceeds to decision step 410, where it is determined if there is a different account for the consumer 14 to use, or perhaps a different amount to exchange. If neither of those conditions can be met, then method 400 terminates ("No" path from decision step 410), and the consumer 14 is not exchanging regular currency 20 for location dependent currency 18 at this time. But if there is another account to use, or a different (lower) amount to make the exchange, then method 400 proceeds back to decision step 408, wherein this time there is expected to be enough regular currency 20 to make the requested exchange. Following a determination that there is enough regular currency 20 ("Yes" path from decision step 408), method 400 proceeds to step 412, in which bank 36 transfers the requested amount of regular currency 20 from the account of the consumer 14 to an account of LDPS manager 200 which can be at the same or different bank 36.

In step 414, LDPS manager 200 transfers an amount of location dependent currency 18 equivalent to the amount of regular currency 18 that was transferred to the account of the LDPS manager 200 in step 412. The location dependent currency 18 is sent to currency issuer 34, which then transfers the location dependent currency 18 to currency server 26, wherein consumer 14 can then access it for making future purchases. According to further exemplary embodiments, location dependent currency 18 includes not only a currency amount, for example, $10, but can also contain additional information, such as restrictions on areas where it can be used (currency value area 2), time restrictions, date restrictions, and even product restrictions (i.e., it can only be used for certain types of products (e.g., food products if used in conjunction with a food stamp program or "women-infant-children" type of service)), among other types of restrictions.

Following step 414, consumer 14 can, at some later time, attempt to make a purchase (step 416), and a request is forwarded to currency server 26 to allow the purchase. This is more fully described according to exemplary embodiments in regard to FIGS. 6A and 6B. In decision step 418, currency server 26 determines if coupons are applicable to the requested purchase. If so ("Yes" path from decision step 418), method 400 proceeds to step 420, wherein currency server 26 obtains the coupon information from coupon issuer 42, and applies the appropriate discount (e.g., number of products, after/before certain dates, times, among other conditions). In decision step 422, coupon issuer 42 determines whether the conditions, if any, have been met. If any conditions exist, and they have been met ("Yes" path from decision step 422), method 400 proceeds to step 424, wherein currency server 26 applies the discount.

If the conditions are not met ("No" path from decisions step 422), method 400 proceeds to decision step 426 and determines whether consumer 12 wants to continue with the purchase (e.g., a consumer 14 might be only interested in completing the purchase because of a discount on the product 10), and if not, then method 400 terminates, and no purchase is completed. If, however, the consumer 14 decides to continue with the purchase ("Yes" path from decision step 426), method 400 proceeds to step 428.

If no coupons are available ("No" path from decision step 418), method 400 proceeds to step 428, in which payment system receives the request for the purchase, authorizes it, and then authorizes the transfer of the appropriate amount of location dependent currency from the account of consumer 14 to the account of the retailer 15 or producer 12 that made the sale. The transfer according to an exemplary embodiment occurs within currency server 26, which maintains all of the location dependent currency accounts for all of the participants of location dependent purchasing system 100.

As discussed above, producers 12 and retailers 15 are, according to an exemplary embodiment, the only participants in the location dependent purchasing system 100 that can exchange location dependent currency 18 for regular currency 20. Method 400 illustrates this process beginning with step 430, wherein a producer 12 and/or retailer 15 request an exchange of location dependent currency 18 for regular currency 20, via currency exchanger 32. Currency exchanger 32 receives the location dependent currency 18-for-regular currency 20 exchange request, in step 430, from, by way of a non-limiting example, producer 12, and in step 432, forwards the request to currency issuer 34. In step 432, currency issuer 34 receives the location dependent currency 18-for-regular currency 20 exchange request from currency exchanger 32, and in step 434, forwards the location dependent currency 18-for-regular currency 20 exchange request to bank 36 in order to enable regular currency 20 to be moved from an account of LDPS manager 200 held in bank 36 to an account of the retailer 15 and/or producer 12 (step 436). As discussed above, LDPS manager 200 can have one or more accounts held with one or more banks 36 that can be used to facilitate the exchange of regular currency 20 for location dependent currency 18, as can retailers 15 and producers 12. Further, during the transfer of regular currency 20, a percentage can be kept by LDPS manager 200 to cover operating expenses, and generate profit, as discussed above. Furthermore, as discussed above, currency insertion system 38, shown in FIG. 4, can insert location dependent currency 18 to any individual consumer's 14 account. Thus, according to an exemplary embodiment, a government (or any other entity) can promote the use of location dependent purchasing system 100 by providing "cash" incentives, rebates, coupons, or simply gifts to motive people (consumers 14) to use location dependent purchasing system 100.

According to still further exemplar embodiments, payment server 28 can monitor all transactions by consumers 14 with regards to retailers 15 and producers 12, and track and store the purchasing information. Such purchasing information can be used by one or more of the producers 14 and/or retailers 15, and coupon issuers 42 to generate coupons and advertisements. Coupons can be sent to electronic wallets, or portable devices 8, at any time, including, for example, when a consumer 14 enters a certain product value area 4. Similarly, advertisements too can be sent to consumers 14 at any time, for example, when, it is determined that consumer 14 is with a specific product value area 4.

According to a first additional aspect, a method for location dependent value tagging of products is provided comprising validating one or more producers of one or more products as being located within a predetermined product value area, generating at least one location dependent tag for each of the one or more products, wherein the at least one location dependent tag includes machine-readable information associated with a unique product identification code, a product position and product value area, and attaching the at least one location dependent tag to a corresponding product. According to the first additional aspect, the predetermined product value area comprises defining a geographical area that includes at least a physical location of a producer and one or more distances from the physical location of the producer, and wherein the predetermined product value area comprises defining a geographical area that includes at least a physical location of a producer and physical locations of one or more purchasers.

According to the first additional aspect, the predetermined product value area comprises identifying one or more specific points of sale locations, and wherein the step of identifying the one or more point of sale locations further comprises creating the product value area only for specific times and days.

According to the first additional aspect, the predetermined product value area comprises one or more of a city, town, zip code, county, state, country, time zone, and country, in any combination of each in whole or part, as the product value area, and wherein the predetermined product value area is provided by a government agency.

According to a second additional aspect, a method for joining producers to a location based payment system is provided, comprising validating one or more producers as members of the location based payment system, issuing a unique certificate with a producer ID to each of the one or more validated producers, identifying all of the products to be offered by each of the one or more validated producers, and maintaining a database correlating products, producers, and certificates, such that a unique tag for each product produced by a validated producer can be created and issued to the producer.

According to the second additional aspect, the step of validating one or more producers comprises verifying that the producer will produce products for sale within a predetermined product value area, and verifying that the producer agrees to abide by a set of rules of the location based payment system.

According to a third additional aspect, a method for using location dependent currency in a location dependent purchasing system is provided, comprising providing the location dependent currency to a user in exchange for regular currency of a nation of a user, and facilitating exchange of the context dependent currency for products offered for sale within a predetermined product value area.

According to the third additional aspect, the value of the location dependent currency is variable according to a position within the predetermined product value area.

According to a fourth additional aspect, a method for enabling purchases within a location based payment system is provided, comprising receiving information from a tag associated with a product for sale within a predetermined product value area and information about a proposed purchaser of the product associated with the tag, verifying that the product is permitted to be sold within the predetermined product value area, and determining its product value area cost, verifying that the proposed purchaser of the product is permitted to purchase the product within the product value area, and that the purchaser has sufficient location dependent currency to afford the purchase of the product, and transferring an amount of location dependent currency equal to the product value area cost from an account of the purchaser to an account of the producer.

According to an exemplary embodiment, implementation of the methods described herein can occur in one or more dedicated processor, or through the various functional blocks shown in FIGS. 1-4. Those of ordinary skill in the art in the field of the invention can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the invention, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The present invention can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the present invention pertains.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

What is claimed is:

1. A method for enabling location dependent exchanges of goods and services using a location dependent currency, comprising:
    verifying, at a currency server, that a product being offered for sale is within a predetermined product value area associated with the product;
    receiving, at the currency server, an offer of location dependent currency in exchange for the product, wherein the location dependent currency is only valid within a predetermined currency value area; and
    completing, at the currency server, the sale of the product in the predetermined product value area by exchanging location dependent currency for the product when the location of the product being offered for sale is within both the predetermined product area and the predetermined currency value area.

2. The method according to claim 1, wherein the step of verifying that a product being offered for sale is within a predetermined product value area comprises:
    determining a location of a product offered for sale by use of a location determination system application in a mobile communications device;
    determining a product identification number of the product being offered for sale;
    communicating the location of the product and the product identification number to a product issuer server, wherein the product issuer server includes a database that contains a list of products and valid product value areas searchable by product identification numbers; and
    determining that the product is being offered for sale in a valid predetermined product value area.

3. The method according to claim 2, wherein the location determination system is one of global positioning systems, Wi-Fi ID, cell-ID look-up, location information on a product tag, and network based positioning.

4. The method according to claim 2, further comprising:
    determining by the currency server that the product is being purchased within a valid currency value area.

5. The method according to claim 1, wherein the step of completing the sale of the product comprises:
    notifying a payment system server that a valid sale of the product can occur; and
    receiving, at the currency server, an authorization transmitted by the payment system server that a predetermined amount of location dependent currency can be transferred from a first location dependent account of a purchaser held at the currency server to a second location dependent currency account of the retailer held at the currency server.

6. The method according to claim 5, further comprising:
    exchanging location dependent currency held in the location dependent currency account of the retailer for regular currency.

7. The method according to claim 6, wherein the step of exchanging location dependent currency for regular currency comprises:
    forwarding a request from either a producer or retailer for the exchange of location dependent currency to a bank, wherein an appropriate amount of regular currency is transferred to an account of the producer or retailer.

8. A method for enabling purchases within a location based payment system, comprising:
    receiving, at a point of sale terminal disposed at a geographical location, information from a tag associated with a product for sale, the information including a product value area associated with the product;
    verifying, by the point of sale terminal, that the product is being sold within the product value area by comparing the geographical location of the point of sale terminal with the product value area;
    receiving, by the point of sale terminal, location dependent currency in proposed exchange for the product, wherein the location dependent currency has value only within a currency value area;
    verifying, by the point of sale terminal, that the geographical location of the point of sale terminal is within the currency value area; and
    completing a transaction of the product in exchange for the location dependent currency based upon results of the verifying steps.

9. The method according to claim 8, further comprising:
    determining, by the point of sale terminal, a product value area cost associated with the product based, at least in part, on the geographical location.

10. The method according to claim 8, wherein the step of verifying that the geographical location of the point of sale terminal is within the currency value area comprises:
    transmitting a request for a currency value area of the point of sale terminal to a currency server; and
    receiving the currency value area from the currency server, and comparing it to the geographical location of the point of sale terminal.

11. The method according to claim 8, wherein the determination of the geographical location of the point of sale terminal comprises:
    using a location determination system application in the point of sale terminal to obtain the geographical information.

12. The method according to claim 11, wherein the location determination system is one of global positioning systems, Wi-Fi ID, cell-ID look-up, location information on a product tag, and network based positioning.

13. The method according to claim 8, wherein the step of completing the transaction of the product comprises:
    notifying a payment system server that a valid sale of the product can occur; and
    receiving, at a currency server, an authorization transmitted by the payment system server that a predetermined amount of location dependent currency can be transferred from a first location dependent account of a purchaser held at the currency server to a second location dependent currency account of the retailer held at the currency server.

14. The method according to claim 13, further comprising:
    exchanging location dependent currency held in the location dependent currency account of the retailer for regular currency.

15. The method according to claim 14, wherein the step of exchanging location dependent currency for regular currency comprises:
   forwarding a request from either a producer or retailer for the exchange of location dependent currency to a bank, wherein an appropriate amount of regular currency is transferred to an account of the producer or retailer.

16. A method for enabling purchasing of location dependent products using location dependent currency, comprising:
   verifying, by an electronic wallet, that a product is within a valid product value area; and
   verifying, by the electronic wallet, that both sufficient location dependent currency is available for purchase of the product and that the electronic wallet is within a valid currency value area.

17. The method according to claim 16, wherein the step of verifying that a product is within a valid product value area comprises:
   determining a geographical location of a product offered for sale by use of a location determination system application in the electronic wallet;
   determining a product identification number of the product being offered for sale;
   communicating the location of the product and the product identification number to a product issuer server, wherein the product issuer server includes a database that contains a list of products and valid product value areas searchable by product identification numbers;
   identifying the valid product value area of the product in the database, and comparing the geographical location of the product to the product value area; and
   determining that the product is being offered for sale in a valid predetermined product value area.

18. The method according to claim 17, wherein the location determination system is one of global positioning systems, Wi-Fi ID, cell-ID look-up, location information on a product tag, and network based positioning.

19. The method according to claim 17, wherein the step of verifying that the electronic wallet is in a valid currency area comprises:
   transmitting request to a currency server to provide the valid currency area for the electronic wallet and comparing the geographical position of the electronic wallet to the valid currency area; and
   determining by the currency server that the product being purchased is within the valid currency value area.

20. The method according to claim 16, further comprising:
   notifying a payment system server that a valid sale of the product can occur; and
   receiving, at the electronic wallet, an authorization transmitted by the payment system server that a predetermined amount of location dependent currency can be transferred from a first location dependent account of an owner of the electronic wallet held at a currency server to a second location dependent currency account of the retailer held at the currency server.

21. The method according to claim 20, further comprising:
   displaying, in the form of a first graphical user interface on the electronic wallet, information pertaining to the transfer of location dependent currency from the location dependent currency account of the owner of the electronic wallet.

22. The method according to claim 20, further comprising:
   exchanging location dependent currency held in the location dependent currency account of the retailer for regular currency.

23. The method according to claim 22, wherein the step of exchanging location dependent currency for regular currency comprises:
   forwarding a request from either a producer or retailer for the exchange of location dependent currency to a bank, wherein an appropriate amount of regular currency is transferred to an account of the producer or retailer.

24. The method according to claim 16, wherein the step of verifying by the electronic wallet that sufficient location dependent currency is available for purchase of the product comprises:
   storing a first amount of location dependent currency that is held in a location dependent currency account of an owner of the electronic wallet; and
   verifying by at least one of inspecting and electronically determining that the amount of the purchase of the product is no more or equal to the stored first amount of location dependent currency in the electronic wallet.

25. The method according to claim 16, wherein the step of verifying that the electronic wallet is within a valid currency value area comprises:
   displaying, in the form of a second graphical user interface on the electronic wallet, information indicating that the electronic wallet is within a valid currency value area.

26. The method according to claim 16, further comprising: initiating purchase of the product.

27. A system for enabling location dependent exchanges of goods and services using a location dependent currency, comprising:
   a currency server configured to verify that a product being offered for sale is within a predetermined product value area associated with the product, and wherein
   the currency server is further configured to receive an offer of location dependent currency in exchange for the product, wherein the location dependent currency is only valid within a predetermined currency value area, and further wherein
   the currency server is still further configured to complete the sale of the product in the predetermined product value area by exchanging location dependent currency for the product when the location of the product being offered for sale is within both the predetermined product area and the predetermined currency value area.

28. The system according to claim 27, further comprising:
   a product issuer server; and
   a mobile communications device configured to determine a location of a product offered for sale by use of a location determination system application in the mobile communications device, determine a product identification number of the product being offered for sale, and communicate the location of the product and the product identification number to the product issuer server, wherein the product issuer server is configured to include a database that contains a list of products and valid product value areas searchable by product identification numbers.

29. The system according to claim 28, wherein the location determination system is one of global positioning systems, Wi-Fi ID, cell-ID look-up, location information on a product tag, and network based positioning.

30. The system according to claim 28, wherein,
   the currency server is further configured to determine that the product is being purchased within a valid product value area and a valid currency value area according to information received from the product issue server contained in the database in regard to the product and product value area.

31. The system according to claim 27, further comprising:
a payment system server configured to receive notification from the currency server that a valid sale of the product can occur, and wherein
the currency server is configured to receive a purchase authorization transmitted by the payment system server such that a predetermined amount of location dependent currency can be transferred from a first location dependent account of a purchaser held at the currency server to a second location dependent currency account of the retailer held at the currency server.

32. The system according to claim 31, further comprising:
a producer and/or retailer; and
a bank, wherein a regular currency account is maintained at the bank for the producer and/or retailer, and wherein the bank is configured to receive a request from the producer and/or retailer to exchange the location dependent currency for regular currency, and to deposit the regular currency in the regular currency account.

* * * * *